United States Patent [19]
Kerman et al.
[11] 3,865,995
[45] Feb. 11, 1975

[54] UNIVERSAL SUBSCRIBER'S LINE CIRCUIT IN A KEY TELEPHONE SYSTEM

[75] Inventors: Stephen Kerman, Merrick, N.Y.; Tsuyoshi Shinoi, Kawasaki, Japan

[73] Assignees: Nippon Tsu Shin Kogyo K.K., Kawasaki-shi, Japan; TIE/Communications Inc., Stamford, Conn.

[22] Filed: Mar. 14, 1973

[21] Appl. No.: 341,209

[52] U.S. Cl. .................................................. 179/99
[51] Int. Cl. .............................................. H04m 1/00
[58] Field of Search .. 179/99, 18 AH, 18 AD, 16 E, 179/16 EA

[56] References Cited

UNITED STATES PATENTS

| | | | |
|---|---|---|---|
| 3,419,685 | 12/1968 | Lilla | 179/99 |
| 3,436,488 | 4/1969 | Barbato et al. | 179/99 |
| 3,649,772 | 3/1972 | Fitzsimons et al. | 179/99 |
| 3,715,513 | 2/1973 | Miller | 179/18 AD |

*Primary Examiner*—Thomas W. Brown
*Attorney, Agent, or Firm*—Kenyon & Kenyon

[57] ABSTRACT

A universal line circuit for use in a key telephone system for connecting a key telephone set directly to a central office or PBX switching system or to such system through conventional interface equipment without use of adapters.

11 Claims, 4 Drawing Figures

UNIVERSAL SUBSCRIBER'S LINE CIRCUIT IN A KEY TELEPHONE SYSTEM

BACKGROUND OF THE INVENTION

The invention relates to subscriber's line circuits for use in key telephone systems, which include one or more key telephone sets, each having a plurality of line keys for selecting a two wire central office or PBX line (hereafter when appropriate, referred to as an office line) from the plurality of such lines connected to the key service unit of the system.

In conventional key telephone systems, the subscriber's lines are connected in parallel arrangement to a key service unit, and each key telephone set can be used to select any one of the central office or PBX lines connected to the key service unit, by operation of the appropriate line key. In order to prevent interference with communications at one key telephone set, by attempted use of the same central office or PBX line at another set in the system, a visual and, if necessary, audible indication of the state of each central office or PBX line is provided at each key telephone set by conventional subscriber's line circuits.

Conventional subscriber's line circuits in key telephone systems provide supervision of the central office or PBX lines, to control their use and to provide indicators of the various states which those lines obtain, for example, idle, talking, holding, incoming call, incoming call abandonment (time out), and held call abandonment, so that interference between users of the key telephone sets in the system is minimized.

However, conventional subscriber's line circuits in key telephone systems cannot be directly connected to central offices or PBX equipment used in the Bell System of the United States of America. Bell System requirements, which have the force of law under Federal Communication Commission (FCC) rulings, are such that key telephone system subscriber's line circuits may only be connected to central office or PBX lines through interface equipment supplied by the Bell System operating companies. Heretofore, expensive interface adapters for connecting each subscriber's line circuit to certain kinds of interface equipment had to be used.

SUMMARY OF THE INVENTION

It is, therefore, an object of the invention to provide a universal subscriber's line circuit for use in a key telephone system, which can be connected, where permitted, directly to central office or PBX lines, or to such lines through conventional interface equipment, without the need for intermediate adapters.

In accordance with the invention, a universal line circuit for use in a key telephone system to connect at least one key telephone set to an office line comprises, in combination, a first pair of line conductors and means, including a normally operated first relay and a normally released second relay, for placing the pair of line conductors in a hold condition, and means, including a normally released third relay, for detecting ringing current applied to the pair of conductorS. Lastly, the line circuit comprises means including the second relay for establishing a talking path over the pair of conductors between the office line and the key telephone set.

DETAILED DESCRIPTION OF PREFERRED EMBODIMENTS

Figure 4:
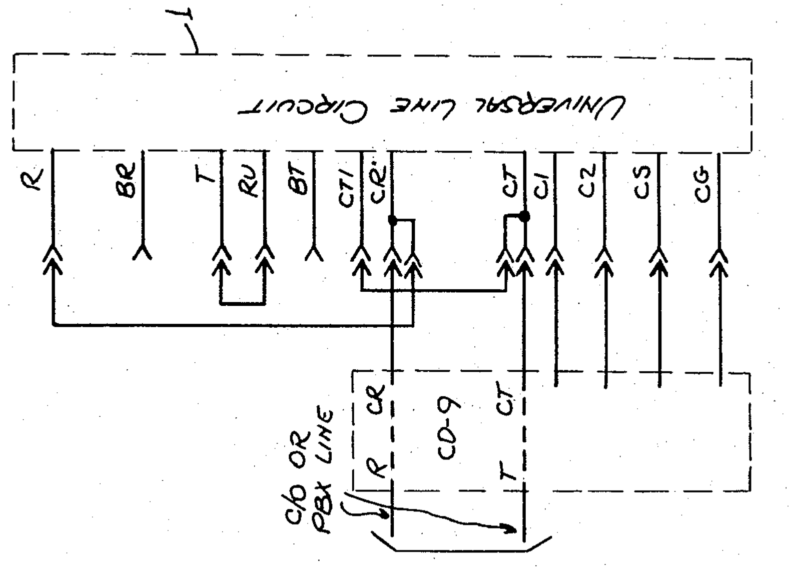
FIG. 4 is an electrical schematic and block diagram illustrating the electrical connections to the line circuit of FIG. 1, when that line circuit is connected to a central office or PBX line through conventional voice connecting (CD9) interface equipment.
Figure 2:
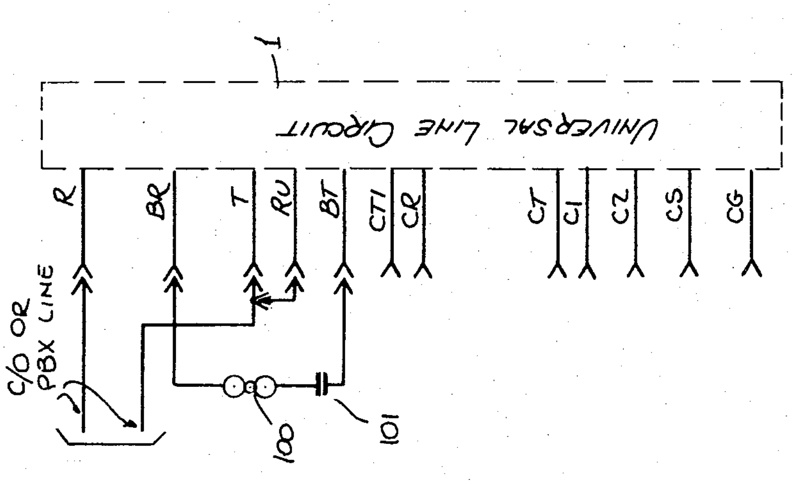
FIG. 2 is an electrical schematic and block diagram illustrating the necessary electrical connections to the line circuit of FIG. 1, when that line circuit is directly connected to a central office or PBX line.

In accordance with the invention, the universal line circuit for use in a key telephone system can be directly connected to a central office or PBX line, as shown in FIG. 2, or to such line through conventional station coupler (STC) apparatus (FIG. 3), or to conventional voice connecting (for example, CD9) apparatus (FIG. 4). In further accordance with the invention, the connections shown in FIG. 4 do not require the use of conventional adapters between the interface apparatus and the line circuit.

In addition, in further accordance with the invention, the universal line circuit herein described is arranged to couple music, or any other suitable program material, to a held call, thereby assuring the held party that he is still connected to the key telephone system. In this regard, it should be noted that the holding functions of the instant line circuit are performed the same way whether the holding party originated, or received the call.

Figure 1:
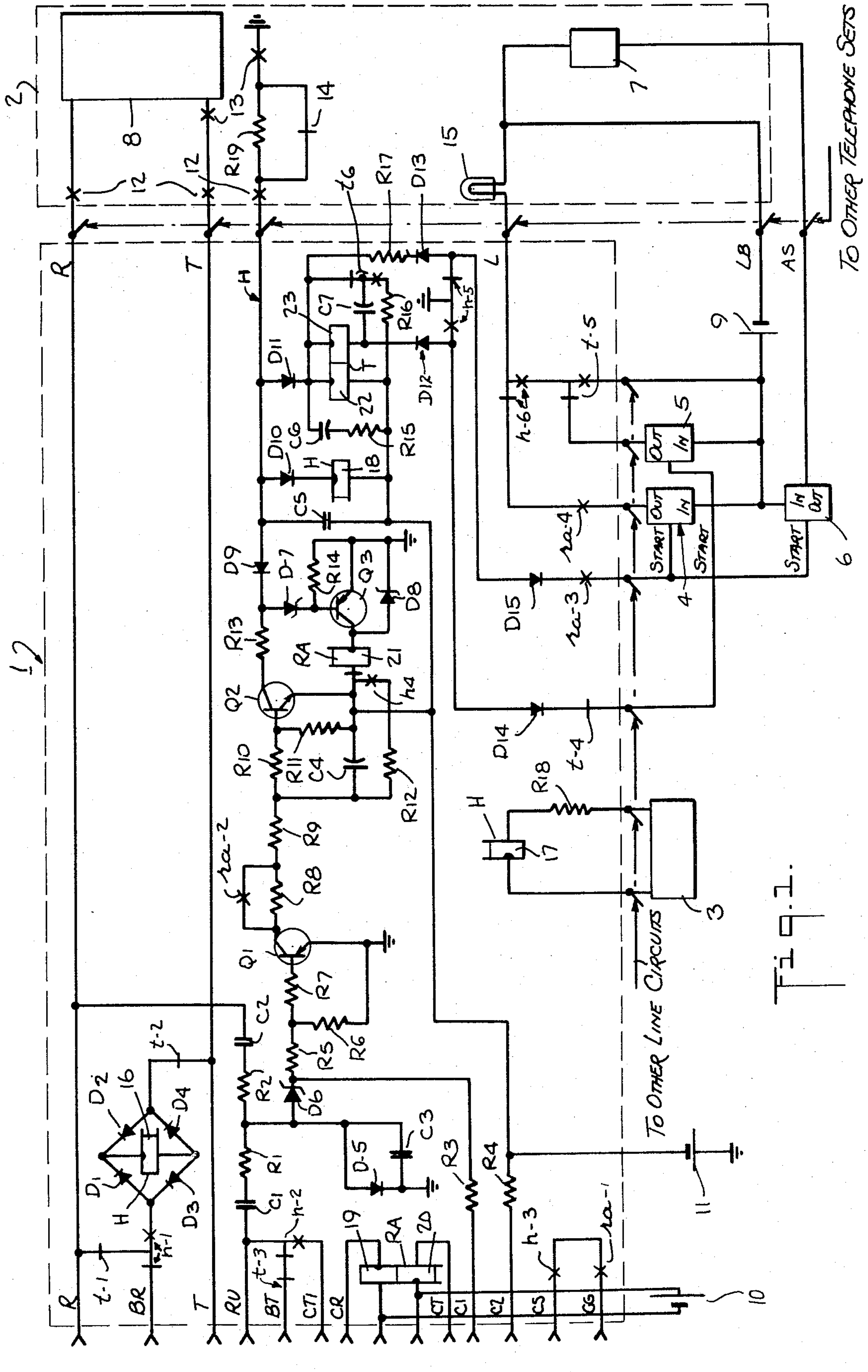
FIG. 1 is an electrical schematic and block diagram illustrating one embodiment of a universal subscriber's line circuit constructed in accordance with the present invention.

Before turning to a detailed description of the preferred embodiments of this invention, the following should be noted with reference to FIG. 1. First, all the pertinent input and output leads of the universal line circuit 1 have letter indentification designations. Where appropriate, the letters selected are conventionally used to identify speech paths (for example, T, R) and signalling paths (for example, L) in telephone systems. Second, for convenience of explanation, various windings on the same relay, for example, relay RA, are shown at their electrical location in the universal line circuit 1; their physical location is of course on the same relay core. Third, the other conventional schematic notations of detached-contact electrical schematic drawings have been used in the drawings. Fourth, those of skill in the art to which the present invention relates know the construction and operation of conventional interface equipment, such as station coupler (STC) apparatus, and voice connection (CD9) apparatus. Accordingly, no detailed description thereof is presented.

Referring now to FIGS. 1, 2, the central office or PBX line T and R leads are directly connected to a pair of line conductors, the T and R leads of the universal subscriber's line circuit 1 (hereinafter universal line circuit). The T and R leads of the universal line circuit 1 are wired or cabled to one side of the normally open or make contacts 12 of a mechanically locking line key (not shown); these key contacts are also wired through a normally open or make hookswitch contact 13 to the transmission network 8 of a key telephone set 2. The H lead of the universal line circuit 1 is connected to one side of the third normally open line key contact 12, the other side of which is connected through normally closed hold key contact 14, and shunt resistor R19, thence to normally open hookswitch contact 13 and ground. The operation of the hold key (not shown) opens hold key contact 14. Releasing the hold key, releases the locked line key, and closes contact 14.

As shown in FIG. 1, the T, R, H, L, LB and AS leads of universal line circuit 1 are wired in parallel to the corresponding leads of all other key telephone sets 2 (not shown) in the system. It is of course understood by those of skill in the art, that the key service unit in a key telephone system incorporates as many universal line circuits 1 as there are central office or PBX lines connected to the system, and the key telephone sets, as many keys. Moreover, the key service unit incorporates additional apparatus, for example, interrupters 4, 5, 6, program or signal source 3, and d-c power supplies 9, 10, 11.

In the quiescent or idle state of the universal line circuit 1, the transistors Q1, Q2 and Q3 are nonconducting. In accordance with the invention, a first relay means T has two windings 22, 23 for hold control and power interruption monitoring functions; the turns ratio of windings 22, 23 is 1:1. Relay means T is normally operated through the connection of winding 22 to external power source 11 and ground potential, via a circuit path including break contact h5 of a second relay means H, diode D13 and resistor R17. However, both relay means H whose windings 16, 17, 18 are for line holding (and held call abandonment), hold signal induction and answering supervision functions respectively, and a third relay means RA, which provides the primary control of the CS, CG answer-monitor leads in a connection to CD9 interface apparatus (FIG. 4), and whose windings 19, 20, 21 and for talking current supply (windings 19, 20) and incoming call indication functions (winding 21), are normally released. In further accordance with the invention, make relay contacts ra-1 and h-3 are used to control dial pulsing and supervision from the key telephone set 2 to the CD9 interface apparatus, over the CS and CG leads.

INCOMING CALL INDICATIONS (FIGS. 1, 2)

Referring to FIGS. 1, 2, when an incoming call is completed at the central office or PBX to the key telephone system, a-c ringing current from the central office or PBX appears between ground and lead T or lead R. Superimposed d-c which may also be present is blocked from universal line circuit 1 by capacitor C1 or capacitor C2. When the instantaneous negative voltage with respect to ground at the anode of zener diode D6 exceeds the sum of the breakdown voltage thereof, and the forward conduction voltage of the base-emitter junction of transistor Q1, current flows from ground through that base-emitter junction via resistors R7 and R5, diode D6, resistor R1 and capacitor C1 via the RU lead, which is strapped to the T lead (FIG. 2), or through resistor R2 and capacitor C2 to the R lead, then through the central office or PBX ringing generator to ground.

Due to the conduction of transistor Q1 during the negative half cycles of ringing voltage, current flows from ground through the collector of transistor Q1 via resistors R8, R9 and R10, and the base-emitter junction of transistor Q2 to the power source 11. Transistor Q2 then conducts from collector to emitter causing transistor Q3 to conduct from ground, via its base-emitter junction, zener diode D7, resistor R13, and the collector-emitter circuit of transistor Q2 through the power source 11 to ground. The conduction of transistor Q3 supplies operating current to winding 21 of relay RA by the circuit comprising ground, the emitter-collector circuit of transistor Q3, winding 21, break contact h-4 and the power source 11.

Relay RA then operates closing a circuit from ground via break contact *h*-5, diode D15, and make contact ra-3, to an interrupter 6 of conventional construction, which is driven in parallel with another conventional interrupter 4. Consequently, interrupted current flows from power source 9 via interrupter 4, make contact *ra*-4, break contact *h*-6 and leads L to each key telephone set lamp 15 corresponding to line circuit 1, then returns to power source 9 on the LB lead from the key telephone sets 2. The lamps 15 flash, and an audible signal is sounded at buzzer 7 over the AS lead by interrupter 6. The key telephone set users are thereby informed that an incoming call has arrived at the universal line circuit 1.

As precautionary measures with respect to the operation of line circuit 1 in response to ringing current, diode D5 prevents an inverse voltage, for example, the instaneous positive ringing voltage with respect to ground, from being applied across the base-emitter junction of transistor Q1. Capacitor C3 prevents false conduction of transistor Q1 resulting from a-c voltages, other than a-c ringing voltage from the central office or PBX, by presenting a high impedance to low frequency a-c ringing voltage, and a low impedance to high frequency noise voltage disturbances, shunting the latter to ground. Zener diode D6 also prevents false conduction of transistor Q1 in response to dial pulses or other transient high voltage conditions, which may appear on the line from the central office or PBX while the universal line circuit 1 is in the idle condition.

Moreover, when transistor Q1 initially conducts, as described above, a portion of the collector current from transistor Q1 charges capacitor C4 via resistors R8 and R9, whose charging time constant is established so that the bias voltage across the base-emitter junction of transistor Q2 increases gradually, during the first several cycles of the a-c ringing waveform, as capacitor C4 charges. This gradual charging delays the conduction of transistor Q2 with respect to transistor Q1, so that even if transistor Q1 should conduct falsely for a short time, transistor Q2 does not conduct. However, once transistor Q2 passes current from collector to emitter, transistor Q3 conducts, and relay means RA operates. At that time, make contact *ra*-2 short circuits resistor R8, and capacitor C4 is able to charge to full capacity more quickly.

During the periodic intervals when no a-c ringing current is supplied from the central office or PBX to the universal line circuit, transistor Q1 does not conduct. However, during these time intervals, the discharge current from the capacitor C4 flows via resistor R10 through the base-emitter junction of transistor Q2. Therefore, transistors Q2 and Q3 maintain a state of conduction during these time intervals, and relay RA remains operated, and continues to drive interrupters 4, 6. Thus, the visual and audible indications of incoming calls at the key telephone sets connected to the universal line circuit 1 are not affected by the periodic interruption of the a-c ringing current from the central office or PBX.

However, whenever the a-c ringing voltage is discontinued, the voltage across capacitor C4 gradually diminishes due to the discharge from this capacitor through the base-emitter junction of transistor Q2. If, for example, due to the abandonment of the call at the originating end, the ringing voltage is not reapplied to the T or R leads for a prolonged period, the voltage across capacitor C4, and hence the base-emitter current of transistor Q2 ultimately becomes insufficient to maintain conduction of transistor Q2. Consequently, transistor Q3 also becomes non-conductive, relay means RA releases, and the signals to lamps 15 and buzzers 7 are cut-off; this sequence is conventionally known as "time out."

Furthermore, when an incoming call from the central office or PBX is received while the universal line circuit 1 is out of service due to failure of the external power supply 11, in accordance with the invention, an audible indication of the presence of an incoming call is produced as follows. Whenever power source 11 fails, normally operated relay T releases. The central office or PBX a-c ringing current then flows in the circuit including lead R, break contacts *t*-1 and *h*-1, lead BR, conventional ringer 100 (FIG. 2), capacitor 101, lead BT, break contacts *t*-3 and *h*-2, lead RU and lead T which is strapped thereto, thereby operating ringer 100.

INCOMING CALL INDICATION (FIGS. 1, 3)

Figure 3:
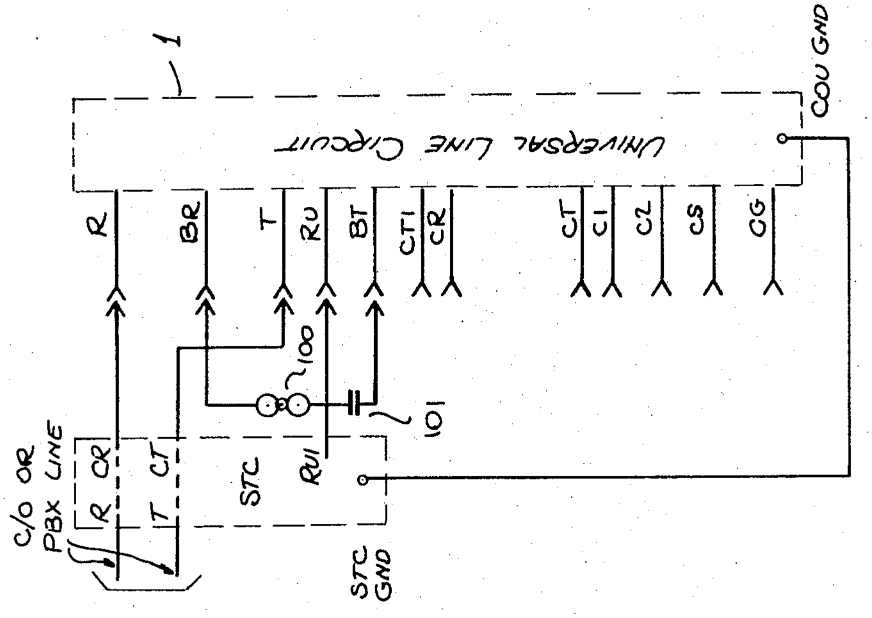
FIG. 3 is an electrical schematic and block diagram illustrating the necessary electrical connections to the line circuit of FIG. 1, when that line circuit is connected to a central office or PBX line through conventional station coupler (STC) interface equipment.

When the connection between the universal line circuit 1 and the central office or PBX line is made through conventional STC interface equipment, the electrical interconnections are as shown in FIG. 3. The a-c ringing signal from the STC apparatus appears between its RU1 and CR leads, and is coupled internally from its CR lead to ground by other circuits within the STC apparatus, thereby appearing between ground and lead RU of the universal line circuit. The consequent operation of transistors Q1, Q2, Q3 and relay means RA is identical to the case of the direct connection with a central office or PBX line as described in detail above. Lamps 15 and buzzers 7 of the key telephone sets operate in the manner described to provide visual and audible indications of the arrival of an incoming call.

INCOMING CALL INDICATION (FIGS. 1, 4)

When the connection between the universal line circuit 1 and the central office or PBX line is made through conventional CD9 interface equipment, the electrical interconnections are as shown in FIG. 4. When the CD9 apparatus receives an incoming call from a central office or PBX line, a short circuit is presented across leads C1 and C2 in the CD9 apparatus. Consequently, steady current flows through the base-emitter junction of transistor Q1, through the circuit consisting of ground, the base-emitter junction of transistor Q1, resistors R7, R5 and R3, the C1 lead, the CD9 apparatus contacts (not shown), the C2 lead, resistor R4 and power source 11; transistor Q1 then conducts.

The operation of the universal line circuit 1 after transistor Q1 conducts is identical to the case of the direct connection to the central office or PBX line as described in detail above. Transistors Q2, Q3 and relay means RA operate, and visible and audible signals are produced at the key telephone sets in the manner set forth above.

INCOMING CALL ANSWERING (FIGS. 1, 2, 3)

The manner in which the universal line circuit 1 operates when an incoming call on a central office or PBX line is answered, is the same for a direct connection to the office line (FIG. 2), or for a connection to the office line through STC interface equipment (FIG. 3).

In either case, when a key telephone set user recognizes the arrival of an incoming call, lifts the handset and operates the appropriate line key, the key telephone set's transmission network 8 is connected to leads T and R via hookswitch make contact 13 and line key make contacts 12. A d-c loop and talking path are then formed across leads T and R and d-c current flows from the central office, PBX or STC interface apparatus via network 8. At the same time, control lead H is grounded by a connection from ground through hookswitch make contact 13 via hold key (not shown) break contact 14, and line key make contact 12.

Relay means RA was already operated by the conduction of transistor Q3, as described in detail above, but ground on the H lead, via diode D9, to the anode of zener diode D7, cuts off transistor Q3. Current simultaneously flows over the control lead H through the H relay means winding 18 via diode D10, and parallel T relay means winding 22 via diode D11. Relay means RA then releases, relay means H operates and capacitor C4 is discharged through resistor R12 by make contact h-4.

The operation of relay H cuts off the current supplied via break contact *h*-5 to T relay winding 22, but current supplied to winding 22 of relay T from lead H via diode D11 holds relay T operated. Due to the combined operation of relay means H and T, the circuit to interrupters 4, 6 is cut-off, and lead L is directly connected from lamps 15 to the lamp lighting power source 9 via make contacts *h*-6 and *t*-5, so that all lamps 15 light steadily, indicating to the users of other key telephone sets in the system that the associated universal line circuit 1 is busy.

INCOMING CALL ANSWERING (FIGS. 1, 4)

When an incoming call arrives at a universal line circuit 1, connected to a central office or PBX line through CD9 interface equipment as shown in FIG. 4, and the key telephone set 2 handset is lifted, and the appropriate line key thereof operated, as described in detail above, relay means T stays operated, relay means RA releases, relay means H operates, and then lamps 15 light steadily as described above.

However, in this arrangement, transmitter current is supplied to the transmission network 8 by the circuit comprising power source 10, RA relay winding 20, lead CT, which is strapped to lead CT1, make contact *h*-2, lead RU, which is strapped to lead T, line key contact 12, hookswitch contact 13, through the transmission network 8, line key contact 12, lead R, which is strapped to lead CR, and relay RA winding 19, thereby reoperating relay RA.

As shown in FIG. 4, the CR and CT leads of the universal line circuit 1 are connected with the CR and CT leads of the CD9 apparatus, which latter leads are in turn transformer coupled to the T and R leads of the central office or PBX line, thereby establishing a talking path between the key telephone set 2 and the calling party through the CD9 apparatus.

Moreover, the answer-monitor circuit (not shown) between CS and CG leads of the CD9 apparatus, is shorted by make contacts *h*-3 and *ra*-1, thereby indicating to the central office or PBX that the called station has answered.

CALL HOLDING (FIGS. 1, 2, 3)

The manner in which the universal line circuit 1 operates when either an incoming or outgoing call is placed on hold, is the same for a direct connection of the line circuit to the central office or PBX line (FIG. 2), or for a connection to the central office or PBX line through STC interface apparatus (FIG. 3).

The call is held by momentarily operating the hold key (not shown) provided in the key telephone set 2, thereby opening hold key contact 14 and removing the short circuit from resistor R19. When contact 14 opens, the voltage on lead H at the anode of diode D11 is determined by the voltage dividing circuit between the power source 11 and ground, comprising winding 18 of relay means H and resistor 19. However, in further accordance with the invention, the voltage at the cathode of diode D11, which is hereinbelow shown to be positive with respect to the anode, is determined by the voltage dividing circuit, comprising the resistances of windings 22 and 23 of relay means T, these windings being connected between the power source 11 and ground by make contact h-5 and diode D12. The resistance values of windings 18, 22, 23 and resistor R19 are chosen so that diode D11 becomes reversed biased when the telephone set hold key is operated. When diode D11 is reversed biased, the same current flows in winding 22 and 23. The magnetic fluxes developed by windings 22, 23 are equal, because as noted above the turns ratio is 1:1. Moreover, winding 22 and winding 23 are connected so that in this condition their magnetic fluxes are mutually opposing, hence relay means T releases.

When the key telephone set user then releases the hold key, the locked line key associated with the universal line circuit 1 automatically releases, and leads T, R and H of the universal line circuit 1 are opened at the key telephone set by the opening of line key make contacts 12. However, H relay means winding 16 has been bridged by the release of relay T across leads T and R of the universal line circuit 1 via the circuit comprising lead R, break contact *t*-1, make contact *h*-1, diodes D1 or D3, H relay winding 16, diodes D4 or D2 respectively, break contact t-2 and lead T. Therefore, the d-c loop across the T and R leads is maintained by the coil 16 of relay means H, the current through which holds relay means H operated.

As a result of the maintained operation of relay H, and the release of relay T, interrupter 5 is started by the connection of ground via the circuit comprising make contact *h*-5, diode D14 and break contact *t*-4. Current interrupted at a different rate from that of interrupter 4, thereafter flows in leads L from power source 9, via interrupter circuit means 5, break contact *t*-5, and make contact *h*-6. Lamps 15 at all stations flash at a rate different from the rate from incoming call indication, thereby indicating to the key telephone set users that a call is on hold.

While the incoming call is on hold, a signal, for example, music or other program material, is induced into H relay means winding 16 from H relay means winding 17, which is connected to a conventional program or signal source 3 through resistor R18. This induced signal is sent across leads T and R through the central office or PBX to the held party as an indication that his call is on hold. At this time, as noted above, lead H is in an open state because of the opening of line key contact 12. To prevent the induction of noise voltages capacitively coupled into lead H from H relay means winding 18 to H relay means winding 16, a bypass capacitor C5 is connected between the H lead and the power source 11. Moreover, since the diode D10 is not forward biased, it presents a high impedance to the passage of such noise signals through winding 18, thus completely suppressing them.

CALL HOLDING (FIGS. 1, 4)

When the universal line circuit 1 is connected through CD9 interface apparatus to the central office or PBX line, universal line circuit leads T and R, as described in detail above, are connected via windings 19 and 20 of relay means RA to power source 10, so that relay means H (winding 16) and relay means RA are held operated by the current supplied thereby from power source 10. Consequently, there is a short circuit between lead CS and lead CG during hold, because of make contacts *h*-3 and *ra*-1.

Furthermore, capacitor C7, which is connected to the relay means T winding 23 and the cathode of diode D12, assures that, even if the automatic release of the line key, which follows the release of the hold key, is slow, and lead H is momentarily grounded via line key contact 12, hold key contact 14 and hook-switch contact 13, the discharge of current from capacitor C7 through relay T winding 23 delays the operation of relay T, thereby causing the on hold condition described above in detail to be maintained.

CALL ANSWERING AFTER HOLDING

When the key telephone set user lifts the handset of his key telephone set, and operates the line key associated with the held universal line circuit 1, the transmission network 8 of his key telephone set, in entirely the same manner as described in detail above, is connected to leads T and R. At the same time, lead H is again grounded, and relay means T reoperates.

The H relay means winding 16 is then disconnected from leads T and R by break contacts *t*-1 and t-2, removing the holding bridge from across the line. Since relay means H is already grounded at winding 18 by lead H, it remains operated. The party at the key telephone set may now talk to the other party directly over the T and R leads when permitted (FIG. 2), or through conventional interface apparatus (FIGS. 3, 4) connected to those leads.

It should be noted with reference to the call-on-hold condition described above, that, in accordance with the invention, when current flow through the T and R leads is interrupted by the central office or PBX, for example, in response to the outside party's abandonment of the call, relay means H releases, since no current is supplied to windings 16 or 18. Furthermore, since relay means H normally self-holds via its make contact *h*-1, relay means H cannot reoperate once it is released, even if a voltage is reapplied across leads T and R from the central office or PBX. Accordingly, in this situation, the universal line circuit 1, and consequently the office line itself, are released from the hold condition and both are restored to the idle condition.

CALL COMPLETION

When the conversation is completed, and the handset is replaced on the hookswitch of key telephone set 2, or the line key is released, the d-c loop across leads T and R is opened. Since the H lead ground is also removed at this time, all relay means in the line circuit 1, except relay means T, release. Capacitor C6 discharges into T relay means winding 22, and thereby prevents the T relay means from releasing while the H relay means releases and its contacts *h*-5 make and break. Lead L is disconnected from power source 9, and lamps 15 extinguish, indicating that the line circuit 1 is in an idle condition.

OUTGOING CALL

Whenever the universal line circuit 1 is in its idle condition, any key telephone set user in the key telephone system may seize the line for making an outgoing call through the central office or PBX, by lifting his handset and operating the appropriate line key. Line key contacts 12 connect the transmission network 8 through hookswitch contact 13 across the T and R leads, and place ground from hookswitch contact 13, through holdkey 14, on the H lead. Current flows over the H lead, via diode D5 through the H relay means winding 18, and via diode D11 through the T relay means winding 22 to power source 11. Relay means H consequently operates, opening the holding path through diode D13 and resistor R17 to the T relay means winding 22, which relay means, however, is held over the H lead as described. Make contacts *t*-5 and *h*-6 complete a circuit from power source 9 to lamps 15, over the L lead, lighting lamps 15 at all key telephone sets to indicate that associated line circuit 1 is in use.

When the line circuit 1 is connected directly to the office line, or through an STC interface, upon operation of line key contacts 12, d-c transmitter current flows in the T and R leads through network 8, seizing the office line, in response to which the central office or PBX connects dial tone, which is transmitted over the T and R leads to the network 8.

When the line circuit of the present invention is connected to the central office or PBX line through a CD9 interface, the leads are strapped as shown in FIG. 4. Operation of the H relay means closes a circuit at make contact *h*-2, so that transmitter current flows from the power source 10 via RA relay means winding 20, the CT and CT1 leads which are strapped, make contact *h*-2, the RU and T leads which are strapped, to the transmission network 8 via line key contact 12 and the hookswitch contact 13, and from the network 8 via line key contact 12, the R lead which is strapped to the CR lead, and RA relay means winding 19 to power source 10. This current operates relay means RA.

The operated relay means H and RA place a short circuit across the CS and CG leads at make contacts *h*-3 and *ra*-1, seizing the CD9 interface apparatus, which repeats the seizure to the central office or PBX. The central office or PBX returns dial tone, which is coupled via the CT and CR leads to the T and R leads, and hence to the transmission network 8.

When the universal line circuit 1 is connected to the central office or PBX directly, or via the STC interface, dial pulses from the key telephone set dial contacts (not shown) incorporated in the network 8, are transmitted directly to the central office or PBX, in the conventional manner, or are repeated by the STC interface from the STC interface leads CT and CR to the central office or PBX line.

When the universal line circuit 1 is connected via a CD9 interface, relay RA in the universal line circuit 1 pulses in response to the interruption of the current through it by the key telephone set dial (not shown). These impulses are repeated by make contact *ra*-1 across the CS and CG leads, and thence repeated to the central office or PBX by the CD9 interface.

CONCLUSION

Although the present invention has been described with reference to a single universal line circuit 1, it is to be understood by those skilled in the art that a plurality of such circuits can be incorporated in a key telephone system, in one-to-one correspondence with the number of central office or PBX lines connected thereto.

Furthermore, those skilled in the art will appreciate that the universal line circuit of the present invention can be used in various conventional key telephone systems, in some instances without any requirements for modification of such system, and in others with but minor modifications to the telephone sets. As noted above, the primary advantage of the instant invention, and one not achieved by prior art line circuits, is the fact that the universal line circuit disclosed herein may be directly connected to a central office or PBX line, or through conventional interface equipment to the central office or PBX without the use of conventional interface adapters, thereby enabling a marked reduction in the complexity and initial cost of a key telephone system installation.

In one embodiment of the present invention, actually constructed and successfully operated, the components shown in FIG. 1 had the following values and/or manufacturer's code designation:

TABLE I

| Specification | | Circuit Designation |
|---|---|---|
| 10K | ohms | R8, R14 |
| 5.6K | do. | R6, R13 |
| 1K | do. | R9 |
| 100K | do. | R10 |
| 15K | do. | R11 |
| 4.7K | do. | R3, R4 |
| 150 | do. | R18 |
| 100 | do. | R12, R16 |
| 470 | do. | R15 |
| 180 | do. | R17 |
| 33K | do. | R1, R2, R5 |
| 0.22 | microfarads | C1, C2, C3, C5 |
| 33 | do. | C6 |
| 47 | do. | C4 |
| 100 | do. | C7 |
| 2SA539 | | Q1 |
| 2SC458 | | Q2 |
| 2SA606 | | Q3 |
| S1R-20 | | D1-D5, D9-D14 |
| ZR230 | | D6 |
| RD13A | | D7 |
| ZF251 | | D8 |
| RA-1Z | | D15 |

TABLE II

| | Relay | D. C. Rest. (ohms) | Operating Current (mA) | Holding Current |
|---|---|---|---|---|
| T : | winding 22 | 500 | 27.8 | |
| | winding 23 | 1000 | | |
| H : | winding 16 | 260 | | 20.0 |
| | winding 17 | 20 | | |
| | winding 18 | 400 | 38.0 | |
| RA : | winding 19 | 120 | 25.2 | |
| | winding 20 | 120 | (1) | |
| | winding 21 | 300 | 55.5 | |

(1) windings 19, 20 are in series aiding connection.

Moreover, as is explained above, and illustrated in Table III below, the various line circuit functions are performed under the control of only three relays, which operate and/or release in various combinations to establish the proper interconnections between the key telephone system and central office or PBX line. For example, relay means RA operates to provide incoming call indications to the key telephone sets, and in a connection to an office line through CD9 interface apparatus, in combination with the H relay means, transmits dial pulses to the central office or PBX, maintains a talking path therebetween, and couples d-c battery to the transmission network 8. Other subscriber line circuit functions, for example, line holding, music-on-hold coupling, held call abandonment supervision and answering supervision are performed by the H and T relay means, either alone or in combination with each other.

The various states taken by respective relay means T, H and RA, and the universal line circuit status which thereby obtains, are shown in Table III. As used therein, "off" means the relay is released, and "on" means the relay is operated.

TABLE III

| RELAY STATE T | H | RA | LINE CIRCUIT STATUS |
|---|---|---|---|
| ON | OFF | OFF | Idle. |
| ON | OFF | ON | Incoming call indication. |
| ON | ON | OFF | (a) Non-CD9 call answering.<br>(b) CD9 outgoing call.* |
| ON | ON | ON | CD9 call answering. |
| OFF | ON | OFF | Non-CD9 hold. |
| OFF | ON | ON | CD9 hold. |
| OFF | OFF | OFF | Key service unit power failure. |

*Relay RA alternates between states.

Moreover, the universal line circuit described herein offers additional advantages over prior art subscriber's line circuits. For example, program material or music-on-hold can be inexpensively transmitted to a held party by utilizing the transformer action of an additional winding on relay means H, which also establishes the appropriate line circuit connections for holding an incoming call, and supervises the abandonment of a held call.

In addition, although the universal line circuit described and illustrated herein incorporates specific diode and transistor structures, those of skill in the art will appreciate that functionally equivalent semiconductor, or electron discharge devices, can be used in place thereof without departing from the spirit and scope of the invention.

While specific embodiments of the invention have been disclosed, variations in procedural and structural detail within the scope of the appended claims are possible, and are contemplated. There is, therefore, no intention of limitation to the abstract, or the exact disclosure herein presented.

What is claimed is:

1. A universal line circuit for a key telephone system to connect at least one key telephone set to an office line comprising, in combination, a first pair of line conductors electrically coupled to said office line;

a normally released relay having first, second and third windings on the core thereof;

means, including said first winding and means for supplying relay operating current thereto, for controlling at least one office line status indicator at said key telephone set;

means, electrically coupled to said line conductors and including said second winding, for maintaining current flow in said pair of conductors during a hold condition, said relay being held operated by said current through said second winding; and means, including said third winding, for coupling audio signals to said pair of conductors through said second winding, when said pair of conductors is in a hold condition.

2. The universal line circuit according to claim 1 wherein said hold current maintaining means further comprises means, including said second winding and a make contact of said relay, for restoring said line circuit to an idle condition upon interruption of said current in said pair of conductors.

3. A universal line circuit for a key telephone system to connect at least one key telephone set to an office line comprising, in combination, a first pair of line conductors electrically coupled to said office line;

a normally released relay having first, second and third windings on the core thereof;

means, including said first winding and means for supplying relay operating current thereto, for controlling at least one office line status indicator at said key telephone set, said controlling means additionally including means, connected to said first winding, for preventing induction of noise signals from said first winding to said second winding, when said relay is being held operated by said current through said second winding; and means, electrically coupled to said line conductors and including said second winding, for maintaining current flow in said pair of conductors during a hold condition, said relay being held operated by said current through said second winding.

4. The universal line circuit according to claim 3 wherein said connected means comprises a diode connected in series with said first winding, said diode being forward biased by said operating current.

5. A universal line circuit for a key telephone system to connect at least one key telephone set to an office line comprising, in combination, a normally released relay having first, second and third windings on the core thereof;

means, electrically coupled to said office line and including said first winding, for indicating the presence of ringing current applied to said office line; and means, electrically coupled to said office line and including the electrical series aiding connection of said second and third windings, for providing an answer monitor signal to the office line, and by means of said connection of said second and third windings, a balanced d-c current supply impedance to the transmission network of said key telephone set.

6. A universal line circuit for a key telephone system to connect at least one key telephone set to an office line comprising, in combination, a first pair of line conductors electrically coupled to said office line;

means, electrically coupled to said line conductors and including a normally operated first relay and a normally released second relay, for placing said pair of conductors in a hold condition;

means, electrically coupled to said line conductors and including a normally released third relay having at least three windings on the core thereof, for indicating the presence of ringing current, applied to asid office line;

means, including at least one contact of said second relay, for indicating that the office line is in use; and means, electrically coupled to said line conductors and including at least one contact and a pair of windingsn of said third relay, connected in electrical series aiding mode, for providing an answer monitor signal to the office line, and a balanced d-c current supply impedance, by means of said pair of windings, to the transmission network of said key telephone set.

7. The universal line circuit according to claim 6 wherein the windings of said third relay are proportioned to respond to dial pulses, supplied thereto from said key telephone set, for repeating said pulses to the office line.

8. The universal line circuit according to claim 7 additionally comprising means, including a winding of said second relay, for coupling audio signals to the office line through said pair of line conductors, when said conductors are placed in a hold condition.

9. The universal line circuit according to claim 6 wherein said hold condition-placing means further includes first, second and third cascaded transistors; an R-C charging network, including make contacts of said third relay, for decreas- the charge time of said network, for coupling the collector of said first transistor to the base of said second transistor and for delaying the occurrence of said second transistor's conduction state with respect to the occurrence of said first transistor's conduction state; means for coupling a ringing current representative signal to the base of said first transistor to place said transistor in its conduction state; means for coupling the collector current of said second transistor to the base of said third transistor; and means for coupling the collector current of said third transistor to a winding of said third relay, which is operated in response to the conduction state of said third transistor; and means, including make contacts of said third relay, for providing audible and visual indications at said key telephone set of the presence of ringing current applied to said office line.

10. The universal line circuit according to claim 9 wherein said second relay incorporates a winding for maintaining current flow in said pair of conductors during said hold condition, said relay being held operated by said current through said winding.

11. The universal line circuit according to claim 6 additionally comprising means, including said first relay, for indicating the arrival of an incoming call during a failure of said universal line circuit's power supply.

* * * * *